United States Patent [19]
Brewer et al.

[11] Patent Number: 6,148,332
[45] Date of Patent: Nov. 14, 2000

[54] MANDATORY MESSAGE DISPLAY AND REPORTING SYSTEM

[75] Inventors: Charles M. Brewer; Robert Sanders, both of Atlanta, Ga.

[73] Assignee: Earthlink, Inc., Pasadena, Calif.

[21] Appl. No.: 09/299,356

[22] Filed: Apr. 26, 1999

Related U.S. Application Data

[63] Continuation of application No. 08/839,970, Apr. 24, 1997.
[60] Provisional application No. 60/016,255, Apr. 24, 1996.

[51] Int. Cl.$^7$ ............................. G06F 13/38; G06F 15/17
[52] U.S. Cl. .......................... 709/218; 709/219; 709/206; 709/207; 379/93.24
[58] Field of Search ................................... 709/218, 219, 709/224, 217, 206, 207, 227, 229; 379/93.24, 100.08

[56] References Cited

U.S. PATENT DOCUMENTS

| | | | |
|---|---|---|---|
| 5,572,643 | 11/1996 | Judson | 395/793 |
| 5,727,129 | 3/1998 | Barrett et al. | 395/12 |
| 5,737,619 | 4/1998 | Judson | 395/761 |
| 5,740,549 | 4/1998 | Reilly et al. | 705/14 |
| 5,809,242 | 9/1998 | Shaw et al. | 395/200.47 |
| 5,913,040 | 6/1999 | Rakavy et al. | 395/200.62 |

OTHER PUBLICATIONS

Prospect Network, LLC Webpage marketing material entitled "The Prospect Network Offers ISPs Significant Revenue and a Value–Add Subscriber Service" and "Internet Service Provider Requirements for Prospect Beta Test"; Printed Feb. 10, 1997, Copyright Notice dated 1997; 8 pgs.
SoftCom Inc. Webpage marketing material entitled "SoftCom's NetAd System: Overview"; Printed Apr. 17, 1997; Copyright Notice dated 1995–1997; 1 pg.
KASi's Webpage advertising material entitled "KASi's Local Advertising Concept: Become an Advertiser Service Access Provider"; Printed Apr. 17, 1997; 2 pgs.
KASi's Webpage advertising material entitled "KASi's ASAP Software"; Printed Apr. 17, 1997; 3 pgs.
@bigger.net Webpage marketing material entitled "Sample Advertising Bar"; Printed Apr. 17, 1997; 1 pg.
Streamix Corporation products Internet homepage; Printed Apr. 17, 1997; Copyright Notice dated 1997; 3 pgs.
Kohda Youji, Susumu Endo; "Ubiquitous advertising of the WWW: Merging advertising of the browser" Computer Networks and ISDN Systems, Elsevier Science, 1996, pp. 1493–1499.
Berners–Lee et al., RFC 1945, "Hypertext Protocol—HTTP/1.0, " May 1996.
Fielding et al., RFC 2068, "Hypertext Transfer Protocol—HTTP/1.1," Jan. 1997.
Brown, Special Edition Usint Netscape 2, Que, pp. 41, 42, 46–48, 74, 259–261, 263, 773–785; 1995.

(List continued on next page.)

Primary Examiner—Mark H. Rinehart
Attorney, Agent, or Firm—Thomas, Kayden, Horstemeyer & Risley, LLP

[57] ABSTRACT

A client software component for a personal computer (PC) interacts with a server of an Internet Service Provider (ISP) to require messages, such as advertisements, to be displayed in a particular manner on a display screen of the PC for interaction with a user and reporting user activity. As long as a valid communication connection between the PC and the ISP exists, the PC is forced to display a particular message in a particular fashion. A user will not be allowed to minimize the message, close the message, or hide the message behind other windows on the PC display screen. The messages will also be interactive so that users are able to get more information related to a particular message, such as by automatically browsing to an associated location on the World Wide Web of the Internet. Information related to interaction with the user is also tracked and communicated back to the ISP for storage and reporting. The user is also able to designate message selection criteria, such as expressing an interest in seeing certain types of advertisements.

19 Claims, 3 Drawing Sheets

OTHER PUBLICATIONS

Network TeleSystems, "TCP Pro," User's Guide; 1994.

Griffith, Victoria, "Media Futures: A hard sell down the line—Advertising is finding its feet in cyberspace," Financial Times, Monday, Mar. 6, 1995, London Edition, p. 13; Mar. 6, 1995.

Reviews: Prodigy 1.0, Macworld p. 168–172; Apr. 1990.

Windows Sockets—An Open Interface for Network Programming under Microsoft Windows, Version 1.1; Jan. 20, 1993.

RFC 1661, The Point–to–Point Protocol (PPP), first 7 pages; Jul. 1994.

Frequently Asked Questions About Windows Sockets Version 1.1, ftp://SunSite, UNC.EDU/Pub/Micro/pc–stuff/ms–windows/winstock/FAQ; Sep. 6, 1994.

Aboba, Bernard D. (1995) "comp.protocols.tcp–ip.ibmpc Frequently asked Questions (FAZ)" Usenet news.answers, available via ftp://ftp.netcom.com/pub/ma/mailcom/IB-MTCP/IBmtcp.zip, 63 pages; Feb. 15, 1995.

Berst, Jesse, "The good, bad, & ugly of Microsoft Network," PC Week, Jun. 26, 1995, v12 n25 p. 67 (1), Ziff–Davis Publishing Company; Jun. 26, 1995.

Metz, Cade, "PC broadcast news: PointCast delivers over the Internet" PC Magazine v15 n13 p. 60(1); Jul. 1996.

"1995 Net Ad Revenues May Top $37 Million: Survey Predicts Advertising Will Drive Content Providers' Profits," Internet Week, Aug. 7, 1995, v. 1, No. 18, ISSN:1081–2474, Phillips Business Information, Inc.; Aug. 7, 1995.

"Lycos signs key advertisers for popular Internet catalog; Microsoft, AT&T, and NECX charter sponsors on leading Web Index," Business Wire, p9181267; Sep. 18, 1995.

Taylor, David, "In context advertising is the next wave," Marketing Computers, v16, n1, p. 28 (2); Jan. 1996.

"Web software keeps ad message on evey screen," Media Daily; Mar. 8, 1996.

"Web advertising comes of age with SNOW; SNOW positions brand names on every home page," Business Wire; Mar. 8, 1996.

Raja, Nimisha, "Big TO dailies and CBC unveil new Net offerings," Marketing (MacLean Hunter) (Marketing) v. 101 p. 3; Apr. 8, 1996.

D. Perkins; Network Working Group Request for Comments: 1134; pp. 3, 4, 8, 10, 13–18, 21, 25; Nov. 1989.

J. Romkey; Network Working Group Request for Comments: 1055; pp: 1, 3; Jun. 1988.

MANDATORY MESSAGE DISPLAY AND REPORTING SYSTEM

CROSS-REFERENCE TO RELATED APPLICATION

This application is a continuation of U.S. patent application Ser. No. 08/839,970, filed on Apr. 24, 1997, which claims the benefit of U.S. Provisional Patent Application Ser. No. 60/016,255, filed Apr. 24, 1996.

BACKGROUND OF THE INVENTION

The present invention relates generally to the field of data communications, and more specifically, to the field of display control and support for computers connected to the Internet.

It is well known that advertising is a source of revenue for many activities on the Internet. For example, many sites, or pages, on the World Wide Web (WWW) include advertisements which generate direct revenue for the site owners and, hopefully, revenue for the advertisers. Unfortunately, little information is typically available about the people who actually view the advertisements. In addition, since most people are often inundated with advertisements, their tendency to ignore all of them may be increased.

More importantly, it is common for advertisers to be unable to accurately gauge the effectiveness, and thus, worth, of advertisements on various web pages. Even if the number of visitors to particular web pages are tracked, it may not be known how many people are viewing the web pages in a way in which the advertisements are actually viewed. In one example, an advertisement may be located at the bottom of a web page such that few people take the time to page down before jumping to another web page. In still other examples, an advertisement may include an image which takes too long to download, increasing the chance that a viewer would simply move on to another location before the image is clear, presuming the viewer is using a browser with image viewing initialized in the first place.

There is, therefore, a need in the industry for a system which addresses these and other related, and unrelated, problems.

SUMMARY OF THE INVENTION

In general, the present invention, in a preferred embodiment, includes a mandatory message display and reporting system that includes a new client software component for a personal computer (PC) interacting with a new server of an Internet Service Provider (ISP) to require certain messages, or information, to be displayed in a particular manner on a display screen of the PC for interaction with a user and reporting user activity.

In the preferred embodiment of the present invention, as long as a valid communication connection between the PC and the ISP exists, the PC is forced to display a particular message in a particular fashion. A user will not be allowed to minimize the message, close the message, or hide the message behind other windows on the PC display screen. In the preferred embodiment, the message will occupy a portion of the PC display screen continuously, yet in other embodiments, the message will appear only intermittently, and in others, will move across the PC display screen. In the preferred embodiment, the content of the messages will originate at a mandatory message server at the ISP before being communicated to the PC for display on the PC display. Because display of the messages is mandatory, the ISP can be assured that users of the PC will be exposed to the messages. Examples of the type of messages which are displayed include any mix of advertisements, news, product announcements, or any other information that the ISP wants to supply.

The messages will be also be interactive so that users are able to get more information related to a particular message. For example, for a PC with a mouse input device, the user is able to simply click on the message to access more information. In the preferred embodiment, this action cause a World Wide Web browser on the PC to browse to a particular web site defined for the particular message. In other embodiments, the message window itself will simply display additional information from the mandatory message server, and in others, function as a simple browser by accessing information on the Internet.

The new software component of the access software will also gather information related to interaction with the user, which is communicated back to the mandatory message server and stored there. Besides tracking which messages from the mandatory message server are actually displayed, as a user accesses additional information, this act is recorded and communicated for storage at the mandatory message server. In addition to storing this type of user-specific message display and interaction history information, the mandatory message server maintains a database of messages categorized at least by user selection criteria (and including the data of the messages, associated URL's, etc.) and a database of user-specific message selection preferences.

Objects, features and advantages of the present invention will become apparent upon reading and understanding the present specification, when taken in conjunction with the accompanying drawings.

DETAILED DESCRIPTION OF THE PREFERRED EMBODIMENTS

Figure 1:
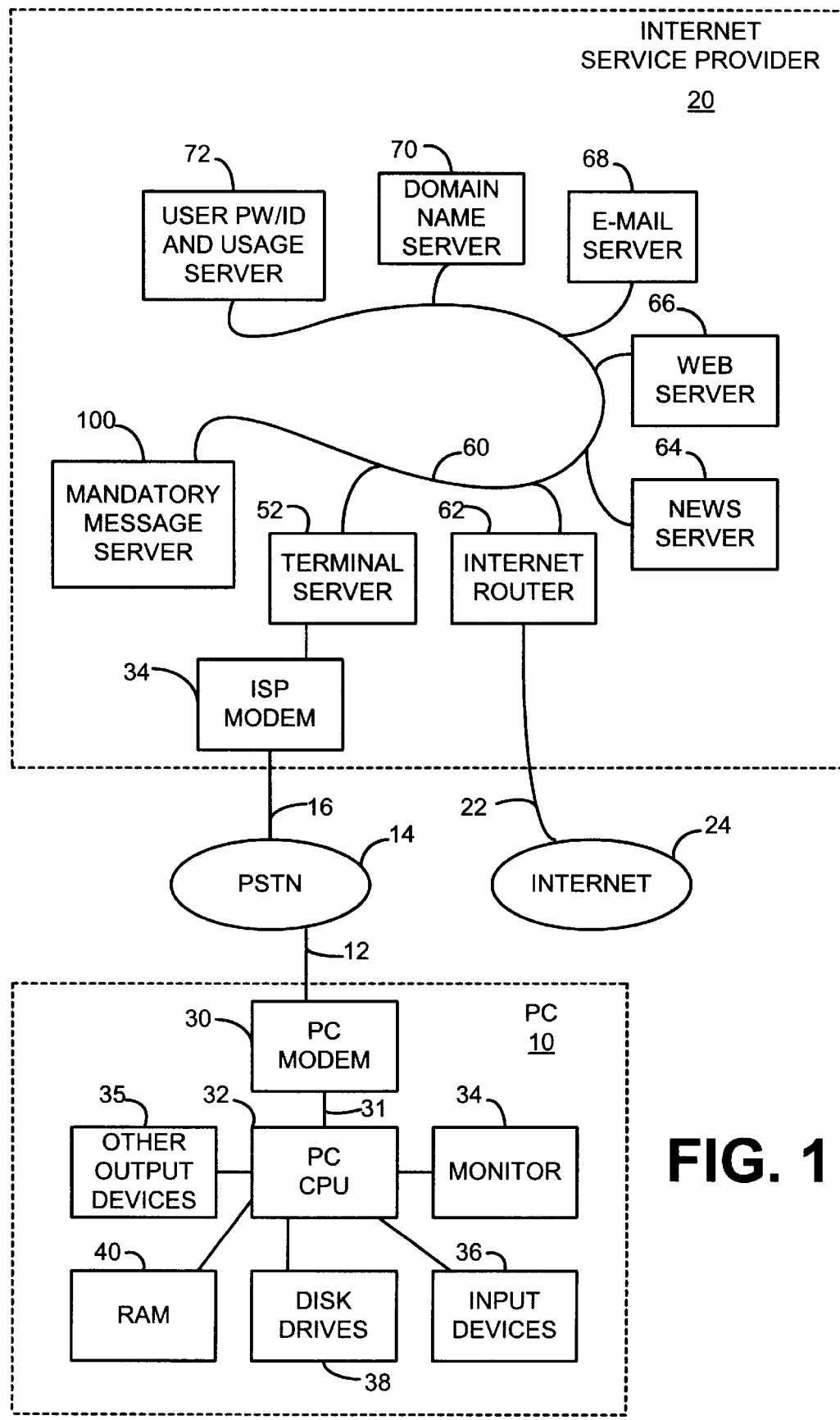
FIG. 1 is a block diagram representation of a PC connected through a conventional public switched telephone network to an ISP, in accordance with a preferred embodiment of the present invention.

Referring to FIG. 1, a PC 10 is shown connected through a conventional telephone user line 12, a conventional Public Switched Telephone Network (PSTN) 14, and a conventional telephone trunk line 16 to an ISP 20. Of course, as would be understood by one reasonably skilled in the telecommunications field, the PSTN 14 includes as many switches and exchanges necessary to complete a path between the PC 10 and the ISP 20, which is typically located remotely from the PC 10. The ISP 20 is also shown connected through a telephone trunk line 22 to the Internet 24. As would also be understood by those reasonably skilled in the art, line 12 includes a single user communication path, lines 16 and 22 support a plurality of communication paths, and lines 12, 16, and 22 include all conventional communication paths (wired and wireless).

Except for the software product of the present invention, the PC 10 represents a general purpose personal computer with Internet communication capabilities. Thus, the PC 10 includes a PC modulator-demodulator (modem) 30 conventionally connected through a communication line 31 (e.g., standard RS-232 cable for external connection or a PC data bus for internal connection) to a PC central processing unit (CPU) 32. The PC CPU 32 is further conventionally connected to a monitor 34, other output devices (e.g., audio output system, printer, PC local area network output device, etc.), input devices (e.g., keyboard, mouse, microphone, other pointing devices, etc.), disk drives 38 (e.g., floppy disk drive, hard disk drive, etc.), and random access memory (RAM) 40.

As would be understood by those reasonably skilled in the art of personal computers, one of the disk drives 38 (typically a hard disk drive) provides nonvolatile storage for programming software (software programs) for controlling the PC CPU 32. In a conventional manner, portions of the programming software stored on one of the disk drive 38 are loaded into RAM 40 whereby the PC CPU 32 directs operation of the PC 10. Thus, the monitor 34 and the other output devices 35 generate output based upon the programming software running in RAM 40 in response to user input received through the input devices 36 and data received from the PC modem 30.

One set of software programs controls communication through the PC modem 30 with the ISP 20. In the preferred embodiment, the communication protocol is known as TCP/IP (Transmit Control Protocol/Internet Protocol). In essence, the PC modem 30 is used by the PC CPU 32, under PC software control, to communicate through the user line 12, the PSTN 14, the trunk line 16, and an ISP modem 34 to establish a PPP (point-to-point protocol) connection with a terminal server 52, as would be understood by one reasonably skilled in the art of Internet communications. In the preferred embodiment, as would be understood by those reasonably skilled in the art, a network stack (one acceptable conventional example of which is TCP-Pro by Network TeleSystems, Inc.) is used to control the PC modem 30 to first dial the telephone number of the ISP 20 and then establish and maintain the PPP connection. Typically, on a higher software level, one component of an access software program invokes the network stack and maintains software hooks into the network stack to know when the PPP connection is valid, according to one implementation of the preferred embodiment of the present invention. Conventional access software programs typically provide an indication to the user when a connection is interrupted.

In a conventional manner, the terminal server 52 is connected through a TCP/IP local area network (LAN) 60 to an Internet router 62, a news server 64, a web server 66, an e-mail server 68, a domain name server 70, and a user password/identification and usage server 72. As would be understood by one reasonably skilled in the art, the terminal server 52 provides a logon prompt to the PC 10 for a user name and a password as a result of communicating with the password/identification and usage database server 72. The domain name server 70 converts between domain names and IP addresses for proper routing of signals to and from the terminal server 52. The PC 10 communicates with the e-mail server 68, the news server 64, and the web server 66 as a result of the terminal server 52 communicating with the domain name server 70 to determine the IP addresses of the various servers. For IP addresses outside the LAN 60, the Internet router 62 is utilized to direct communication through the trunk line 22 to the Internet 24.

The ISP 20 also includes a new mandatory message server 100 which communicates with the PC 10 as programmed with a new software component of the access program. In the preferred embodiment of the present invention, as long as a valid PPP connection between the PC 10 and ISP 20 exists, the monitor 34 is forced to display a particular message in a particular fashion. A user will not be allowed to minimize the message, close the message, or hide the message behind other windows (i.e., an "always on top" flag is set in the message window data structure).

Figure 2:
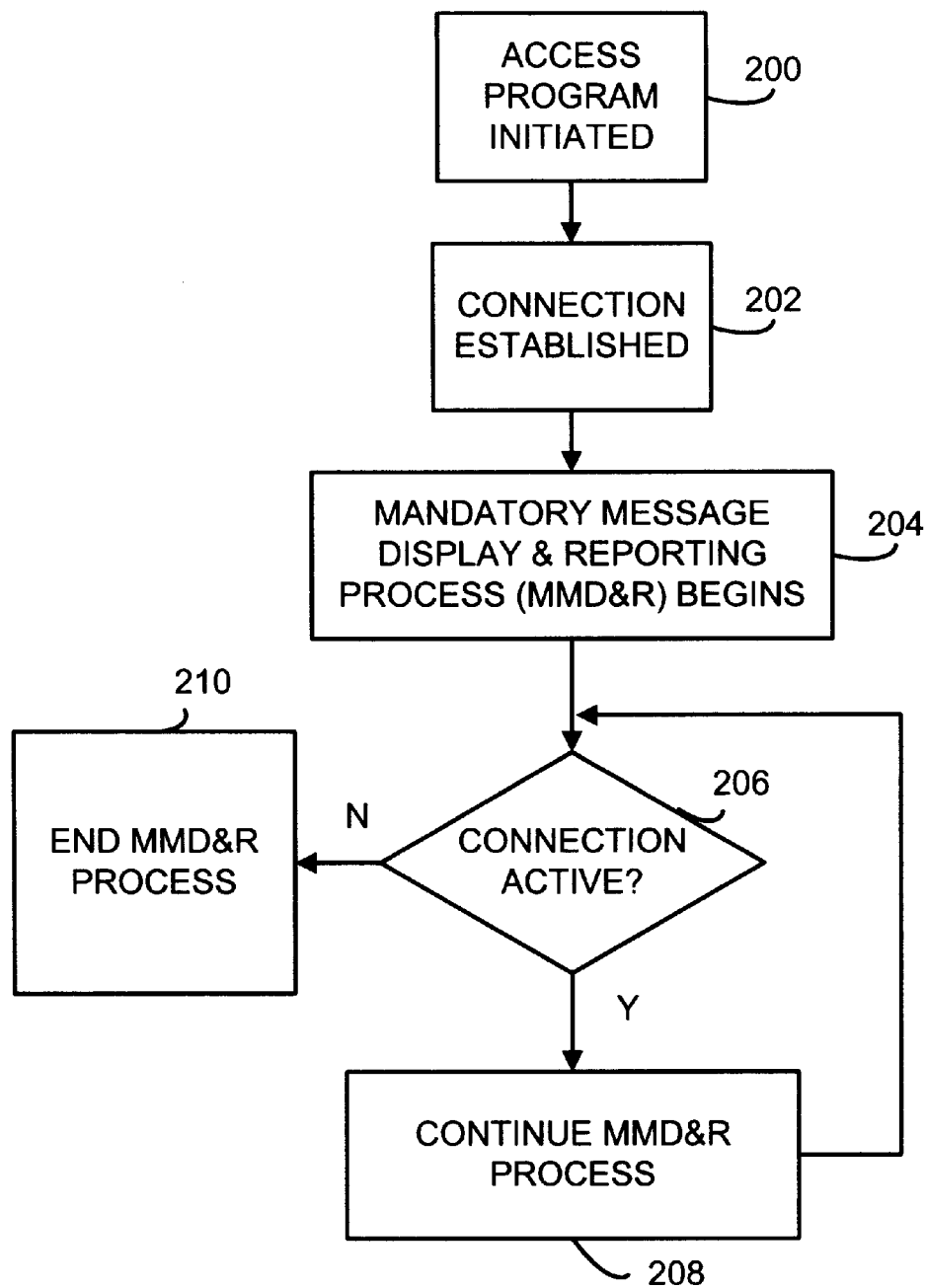
FIG. 2 is a flow chart representation of the initiation, maintenance and termination of the mandatory message display and reporting process, in accordance with a preferred embodiment of the present invention.

Refer now to FIG. 2, which shows a flow chart representation of the initiation, maintenance and termination of the mandatory message display and reporting process, in accordance with a preferred embodiment of the present invention. After the access program is initiated (step 200), a communication connection between the PC 10 and the ISP 20 is established (step 202). Subsequently, the mandatory message display and reporting (MMD&R) process begins (step 204) and continues (step 208) until (decision 206) a communication connection is no longer valid (step 210). According to one implementation of the preferred embodiment of the present invention, one component of the access program invokes the network stack and maintains software hooks into the network stack to know when the PPP connection is valid.

In the preferred embodiment, the message will occupy a portion of the screen continuously, yet in other embodiments, the message will appear only intermittently, and in others, will move across the monitor screen. In the preferred embodiment, the content of the messages will originate at the mandatory message server 100 before being communicated to the PC 10 for display on the monitor 34. Such messages will include stationary and moving text and graphics, and in other embodiments of the present invention, sound is provided for output through speakers (outer output devices 35). Because display of the messages is mandatory, the ISP can be assured that users of the PC 10 will be exposed to the messages. Examples of the type of messages which are displayed include any mix of advertisements, news, product announcements, or any other information that the ISP wants to supply. It is anticipated that advertisers will be willing to make payments to the ISP in return for displaying these messages.

While the messages originate at the mandatory message server 100, temporary storage of a plurality of messages is also provided at the PC 10. Thus, the PC 10 cycles through a supply of temporarily stored messages until a bulk updating of the messages is accomplished through communication with the mandatory message server 100. While the user is unable to disable display of the mandatory messages, user configuration options are provided to control other aspects of the displaying of the messages. For example, the user is able to cause the mandatory message server 100 to provide only certain types of messages (e.g., sports advertising only, messages related to a particular geographic area, other demographic data, etc.). Furthermore, a list of the temporarily stored messages is also available for the user to select a particular message for immediate viewing.

The messages will be also be interactive so that users are able to get more information related to a particular message. For example, for a PC 10 with a mouse input device 36, the user is able to simply click on the message to access more information. In the preferred embodiment, this action cause a World Wide Web browser (an acceptable example of which is Netscape Navigator by Netscape Communications Corp.) to browse to a particular web site defined for the particular message. In other words, the URL (universal resource locator) is passed to the browser for accessing the particular web site, and if the browser is not currently running, it will be invoked. In other embodiments, the message window itself will simply display additional information from the mandatory message server 100, and in others, function as a simple browser by accessing information at a particular URL on the Internet 24.

The new software component of the access software will also gather information related to interaction with the user. This information is communicated back to the mandatory message server 100 and stored there. Besides tracking which messages are actually displayed, user interaction tracking is also provided. In other words, as a user accesses additional information (e.g., browses to a particular web site based upon clicking on the mandatory message area), this act is recorded and communicated for storage at the mandatory message server 100. In addition to storing this type of user-specific message display and interaction history information (which is useful for billing in some examples), the mandatory message server 100 maintains a database of messages categorized at least by user selection criteria (and including the data of the messages, associated URL's, etc.) and a database of user-specific message selection preferences. The temporary messages and the limited user display options are stored at the PC 10.

Figure 3:
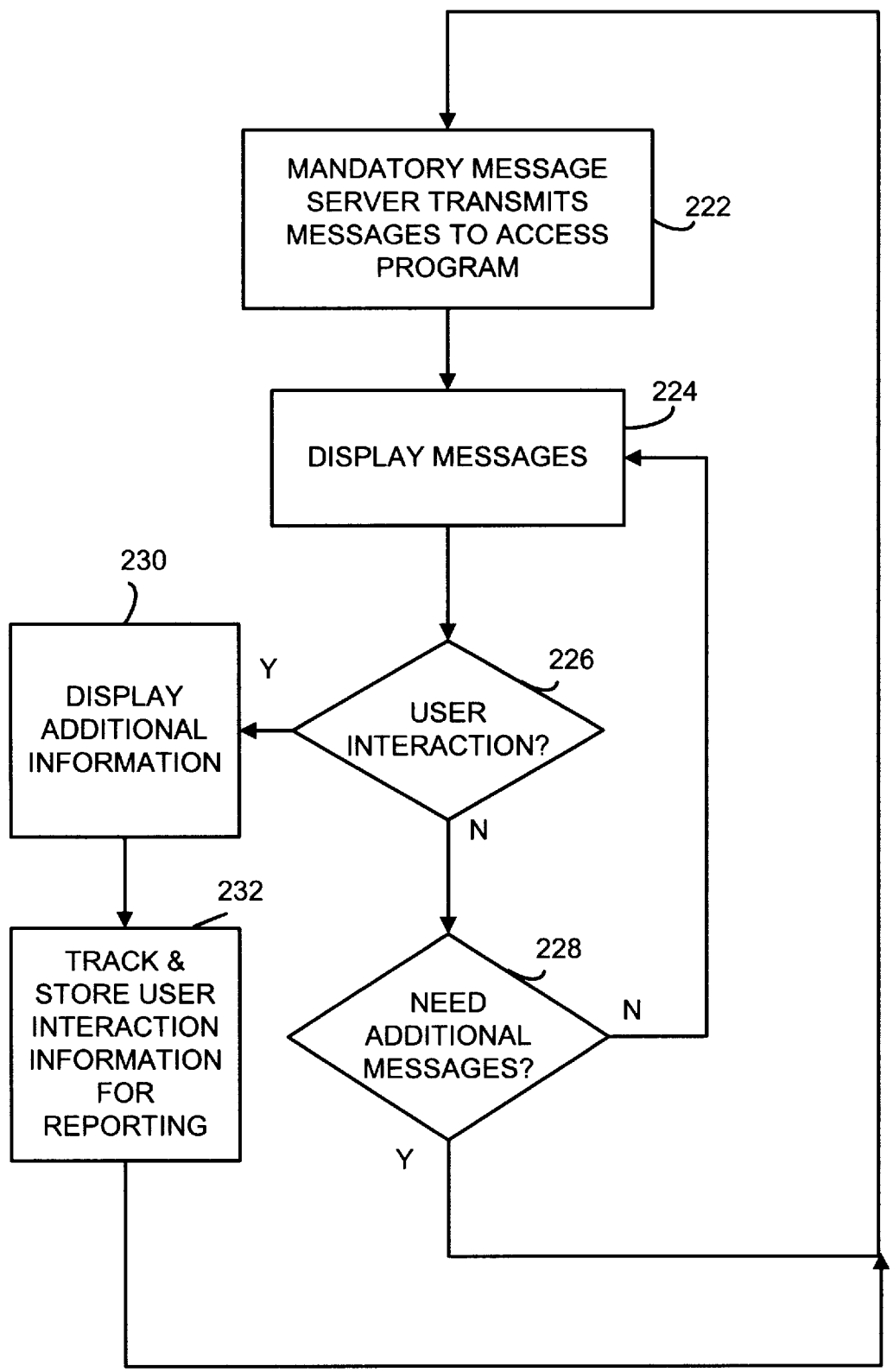
FIG. 3 is a flow chart representation of the mandatory message display and reporting process, in accordance with a preferred embodiment of the present invention.

Referring now to FIG. 3, which shows a flow chart representation of the MMD&R process, in accordance with a preferred embodiment of the present invention, the mandatory message server 100 transmits the plurality of messages to the PC 10 (step 222). Subsequently, under control of the new software component of the access software, the PC 10 begins displaying the messages (step 224). Without user interaction (decision 226), messages are displayed (step 224) until new messages are needed (decision 228) and are transmitted from the mandatory message server 100 (step 222). After user interaction, such as clicking a mouse on the message, additional information is displayed (step 230). Next, a record of the user interaction is stored at the mandatory message server 100 for reporting (step 232).

It is intended that the scope of the present invention also include various other embodiments. Accordingly, it should be understood that the each of the embodiments disclosed herein, including the preferred embodiment, includes features and characteristics which are considered independently inventive. Thus, the disclosure of variations and alterations of the preferred embodiment is intended only to reflect on the breadth of the scope of the present invention without suggesting that any of the specific features and characteristics of the first preferred embodiment are more obvious or less important.

The scope of the present invention is intended to include other communications devices besides personal computers, such as small personal data assistants (PDA's) and other communication devices capable of Internet communication, as well as other types of data network connections (wired and wireless). In other embodiments of the present invention, the presence of the mandatory message is triggered by the operation of a particular software program rather than by the existence of a valid communication connection.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the corresponding structures, materials, acts, and equivalents of all means or step plus function elements in the claims below are intended to include any structure, material, or acts for performing the functions in combination with other claimed elements as specifically claimed.

We claim:

1. A method for displaying, on an Internet client, messages stored on an Internet server, said method comprising steps of:

determining whether an active communication connection exists between the Internet client and the Internet server;

transmitting messages stored on the Internet server for display on the Internet client responsive to determining that an active communication connection exists between the Internet client and the Internet server;

displaying on the Internet client the messages received from the Internet server as long as the active communication connection exists between the Internet client and the Internet server.

2. The method of claim 1, wherein said Internet client includes a personal computer, and wherein said Internet server includes an Internet Service Provider.

3. The method of claim 1, wherein said determining step includes deciding whether a valid point-to-point protocol (PPP) connection exists between the Internet client and the Internet server.

4. The method of claim 3, wherein said deciding step includes maintaining hooks into a terminal control protocol/Internet protocol (TCP/IP) network stack to determine when the valid PPP connection exists between the Internet client and the Internet server.

5. The method of claim 1, wherein said transmitting step includes transmitting a plurality of messages from the Internet server to the Internet client.

6. The method of claim 1, wherein said displaying step includes displaying on the Internet client the messages received from the Internet server only so long as the active communication connection exists between the Internet client and the Internet server.

7. The method of claim 1, wherein said displaying step includes displaying messages in manner in which a user is prevented from disabling or hiding the messages.

8. The method of claim 1, wherein said displaying step includes displaying advertisements in a window separate from a World Wide Web browser window.

9. The method of claim 1, further comprising a step of providing additional information to a user responsive to a user interacting with a displayed message.

10. The method of claim 9, wherein said step of providing additional information includes browsing to a location on the World Wide Web associated with the displayed message.

11. The method of claim 9, further comprising a step of recording specifics about said user interaction and said step of providing additional information.

12. A mandatory message display system comprising:

a mandatory message server including stored messages for display; and a client connected to said mandatory message server, said client including a server client connection validator and a mandatory message display unit, wherein said mandatory message display unit displays on said client the stored messages as long as a valid server client connection exists, as determined by said server client connection validator.

13. The system of claim 12, wherein said mandatory message server utilizes user-specific selection criteria associated with said stored messages.

14. The system of claim 12, wherein said mandatory message server records the displaying of stored messages in a user-specific manner.

15. The system of claim 12, wherein said client includes a user interaction mechanism for displaying additional information responsive to detecting user interaction with a displayed message.

16. A mandatory message display system comprising:

mandatory message server including stored messages for display; and a client connected to said mandatory message server, said client including means for validating a communication connection between said mandatory message server and said client, means for receiving stored messages from said mandatory message server, and means for displaying the stored messages received from said mandatory message server as long as a valid communication connection exists between said mandatory message server and said client.

17. The system of claim 16, wherein said mandatory message server further includes means for identifying, and sending to said client, stored messages selected by user-specific criteria.

18. The system of claim 16, wherein said mandatory message server further includes means for recording the displaying of stored messages in a user-specific manner.

19. The system of claim 16, wherein said client includes means for detecting user interaction with a displayed message and for displaying additional information responsive to detecting user interaction with a displayed message.

* * * * *